Aug. 29, 1939.  E. L. MASTERS  2,171,068
CART
Filed June 6, 1938
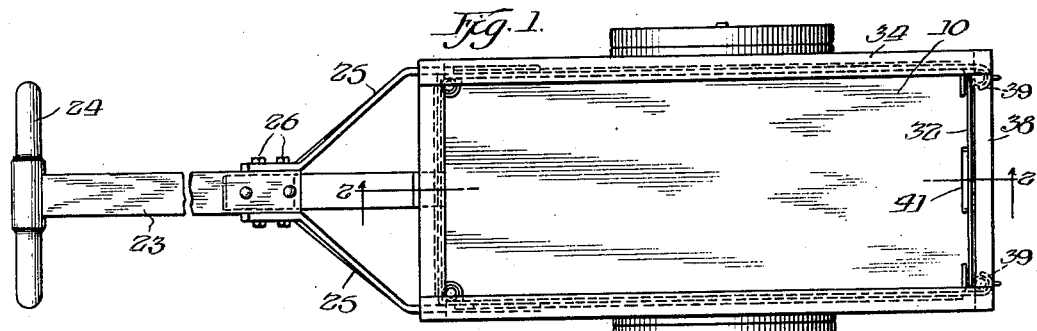
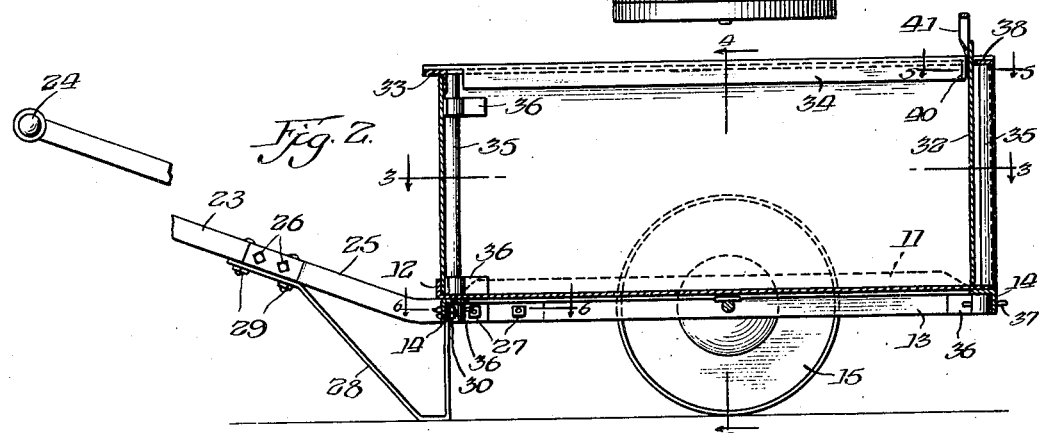
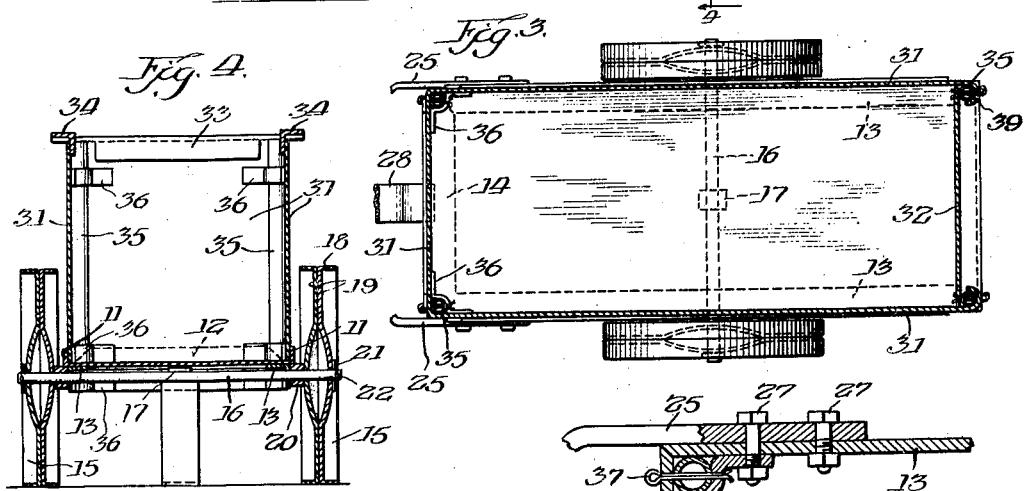
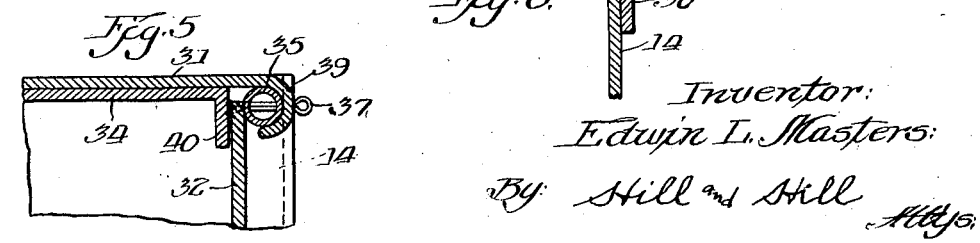
Inventor:
Edwin L. Masters
By: Hill and Hill
Attys.

Patented Aug. 29, 1939

2,171,068

UNITED STATES PATENT OFFICE 2,171,068

CART

Edwin L. Masters, Chicago, Ill.

Application June 6, 1938, Serial No. 212,043

7 Claims. (Cl. 280—51)

My invention relates to two-wheeled hand propelled vehicles and more particularly it relates to general service carts adapted for use in transporting a variety of heavy or bulky materials.

The invention has as one of its objects the provision of a cart of the kind described having a rigid solid bottom suitably connected with the axle shaft and having relatively rigid removable side and end walls cooperating with the bottom and with each other to provide a suitable container for loose material such as dirt, gravel and the like and so balanced that the weight of the cart and the contents of the container is substantially all carried by said shaft.

Another object of the invention is the provision of improved vertical standards removably connected with the bottom of the cart and cooperating therewith to reinforce and prevent lateral and longitudinal movement of the side and end walls of the container.

A further object of the invention is the provision of improved means for connecting the tongue with the bottom of the cart.

A still further object is the provision of a cart having bottom, side, and end walls and cooperating standards providing a container for loose materials, the side and end walls being removable to adapt the cart for hauling elongated articles such as lumber or the like of greater length than the body of the cart, the standards being also removable to adapt the cart for hauling articles projecting laterally beyond the bottom of the cart. A cart embodying the principles of the invention may be constructed of any convenient dimensions and load carrying capacity and is especially adapted for use as a substitute for a wheelbarrow. The load bearing capacity of a wheelbarrow of ordinary size is approximately two hundred pounds and a cart constructed as described and shown and having an over-all width of approximately twenty-four inches has an equivalent capacity and is thereby adapted for passing through an ordinary gate or doorway. The cart also has a wider wheel base than a wheelbarrow and is not only more easily propelled and manipulated for dumping, but by reason of its wide wheel base is more desirable for use in landscape and garden work since the wheels do not cut into sod or soil surfaces and leave unsightly tracks.

Among the further objects of the invention is the provision of a cart which is of light weight, easily propelled, strong, durable, ornate, inexpensive to manufacture, and satisfactory for its intended purpose.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

Referring now to the drawing, Figs. 1 and 2 are respectively plan and sectional elevational views of a cart embodying the principles of the invention;

Figs. 3 and 4 are respectively views along the lines 3—3 and 4—4 of Fig. 2; and

Figs. 5 and 6 are views of details drawn to a larger scale and respectively taken along the lines 5—5 and 6—6 of Fig. 2.

Referring now more particularly to the drawing, the cart comprises a plurality of rigidly connected members providing a support, one of which is a longitudinally elongated bottom plate, designated by the numeral 10, and having its edges turned up to provide side flanges 11 and a front end flange 12 tending to increase the rigidity and to otherwise reinforce the plate. Additional reinforcement for the edges of the plate 10 consists of side angle bars 13 and end angle bars 14, each having one leg fastened to the underside of the plate by spot-welding or by any other suitable means, and the other leg providing a downwardly projecting flange.

The bottom plate 10 is supported by wheels 15 suitably journaled on the ends of an axle 16 extending through and projecting beyond the side angles 13, the axle being positioned slightly back of the center of gravity of the cart and sufficiently close to the center of gravity that the load is approximately balanced on the axle for all conditions of loading. A plate or bar 17, rigidly fastened to the axle 16 by spot-welding or the like, is positioned to engage the plate 10 and to thereby prevent the shaft from rotating.

The cart is especially adapted for use in landscape and garden work by providing the wheels 15 with relatively wide rims 18 which enable heavy loads to be easily hauled over sod and soil and without leaving permanent or unsightly tracks. Each wheel 15 preferably comprises two metal discs 19 spot-welded together and providing aligned out-turned flanges forming the rims 18. The middle portions of the discs 19 are concave outwardly to provide an ornate appearing hub and to provide a wider bearing. A bearing block 20, positioned between the hub and the adjacent angle 13, and a cooperating washer 21 and pin 22 on the outside of the hub hold each wheel against lateral movement on the axle 16. The wheels 15 are not only ornate, but they are relatively light in weight since the discs 19 are constructed of relatively thin metal sheets.

The cart is adapted to be propelled by a tongue 23 having a handle 24 suitably mounted on its front end. The tongue 23 is rigidly connected with the bottom plate 10 of the cart by a pair of bars 25 fastened to the tongue by bolts 26 and respectively fastened to the oppositely positioned side angles 13 by means of bolts 27. The tongue 23 is inclined upwardly and outwardly to bring the handle 24 to a suitable elevation for convenient manipulation when the body of the cart is substantially horizontal. The bottom plate 10 is normally maintained by gravity in a substantially horizontal position both when loaded and unloaded by means of a bar 28 forming a leg having one end connected by bolts 29 with the tongue 23 and its other end connected with the front angle 14 by bolts 30, the leg extending downwardly and having its intermediate portion so inclined that one part thereof forms a ground rest or support as shown.

The bottom plate 10, the wheels 15 and the axle 16, and the tongue 23 assembled as described provide a vehicle adapted for use in transporting bulky heavy articles having lateral and longitudinal dimensions such that they project beyond the bottom plate.

The cart is also adapted as a vehicle for loose materials such as dirt, gravel and the like by providing removable side and end walls of suitable material cooperating with the bottom plate 10 to provide a container. The container includes a U-shaped plate 31 preferably continuous and consisting of metal or other suitable material, providing rigid front end and side walls, and a rear plate 32 operable as a slip or tail gate. The plate 31 rests on the bottom plate 10 and fits within its upturned flanged edges 11 and 12. The top of the plate 31 is reinforced by a front angle 33 and side angles 34 fastened to the plate by spot-welding or the like with the front ends of the angles 34 substantially overlapping and similarly connected to the adjacent ends of the angle 33.

Standards 35, shown as tubular members, are positioned, one at each corner of the container to prevent longitudinal or lateral movement thereof and to permit the plates 31 and 32 to be moved vertically for removal and installation as desired. The front standards 35 project through apertures provided by the bottom plate 10 and are each maintained in contact with the plate 31 adjacent the corners by means of a plurality of bars 36, one of which is positioned below the plate 10 and has one end spot-welded to the angle 14 and its other end fastened to the adjacent angle 13 by one of the bolts 27 connecting the adjacent bar 25 with the angle 13. The intermediate portion of each bar 36 is curved to fit the standards 35 and the ends of the bars positioned above the bottom plate 10 are respectively fastened to the plate 31 by spot-welding. The front standards 35 are held against vertical movement by cotter pins 37 projecting through the lower bar 36 and the vertical flange of the adjacent angle 14, as best shown in Figs. 2 and 6. The rear standards 35 project through the bottom plate 10 and the horizontal leg of the rear angle 14 and are each held against vertical movement by a cotter pin 37 extending through the vertical leg of the angle. The rear ends of the plate 31 provide inturned arcuate flanges 39 having a sliding fit with the adjacent standards 35 to permit removal of the plate.

A bar 38, extending over the top of the rear standards and connecting the ends of the top legs of the side angles 34 forms a brace, preventing bending of the rear ends of the plate 31 either outwardly or rearwardly. The contiguous ends of the vertical legs of the oppositely positioned angles 34 are respectively inturned to provide projections 40 arranged in spaced relation and cooperating with the bar 38 to provide guides for insertion and removal of the plate or tail gate 32.

The plate 32 is positioned on the bottom plate 10 and in bearing contact with the standards 35 with its upper end projecting above the bar 38 and the angle projections 40. A handle 41 is provided on the plate 32 to facilitate its removal to permit the contents of the cart to be dumped by gravity, this being accomplished by lifting the tongue 23 to tilt the cart about the axle 16. The axle is so positioned that the center of gravity of the cart including the contents of the container when filled to capacity is slightly in front of the axle and sufficiently close to the axle that a slight tilting of the plate downwardly and rearwardly by elevating the tongue brings the center of gravity into exact coincidence with the axle. The lines X—X of Fig. 1 and Y—Y of Fig. 2 indicate a vertical plane through the center of gravity of the load, the position of this plane being approximately the same when the cart is empty and when evenly loaded.

The cart with the side and end walls removed is especially adapted for transporting heavy bulky articles such as timber or the like, and since the bottom plate is relatively low, the labor of loading is minimized. Removal of the standards, as well as the wall plates, adapts the cart as a vehicle for heavy articles such as metal vases and urns having no handles, which, when filled with earth, are so heavy and cumbersome that one person cannot carry them. The cart is especially adapted for use by florists who frequently have to move such urns or vases from cemetery driveways to burial lots located at some distance. The wide wheel base of the cart renders its use in cemeteries unobjectionable and its easy manipulation makes it possible for one man to move articles whose weight or bulk would otherwise require two or more to carry the same.

The various elements comprising the cart other than the tongue 23 and the handle 24, are preferably constructed of relatively thin metal of standard sizes and shapes and are in general connected by spot-welding, thereby providing an inexpensive, strong, durable, ornate, and lightweight vehicle adapted to be advantageously used for a great variety of purposes, only a few of which have been mentioned.

Having thus described my invention, it is obvious that various immaterial modifications may be made in the same without departing from the spirit of my invention; hence I do not wish to be understood as limiting myself to the exact form, construction, arrangement, and combination of parts herein shown and described or uses mentioned.

What I claim as new and desire to secure by Letters Patent is:

1. A cart consisting of a horizontally extending load supporting plate having upwardly projecting side and front end flanges and downwardly projecting marginal flange members extending around the plate, a tongue rigidly connected with said plate, an axle extending transversely of and connected with said marginal flange members, a pair of wheels respectively mounted on the ends of said axle in equally spaced relation to said plate, a downwardly extending leg member rigidly connected with said tongue adapted to rest upon the ground with said plate in substantially horizontal position, removable side and end wall plates resting upon and cooperating with said bottom plate to provide a container, and means cooperating with said upwardly projecting flanges adapted to hold said wall plates against lateral and longitudinal movement relative to the bottom plate and to permit vertical movement of said wall plates to effect their removal.

2. A cart comprising a container consisting of side and end walls superimposed upon a horizontally extending bottom plate having its sides and front end upturned to provide corresponding flanges, angles extending around the marginal edges and welded to the bottom of said plate to provide downwardly projecting flanges, a pair of supporting wheels, an axle extending through the vertical legs of said side angles and providing a mounting for the wheels, a forked tongue member having a rigid connection with said side angles, a supporting member connecting the tongue member with the front angle and having its intermediate portion extending downwardly to provide a ground rest, the front end and side walls of the container overlapping and operatively engaging the contiguous flanged edges of the plate, and means cooperating with said flanged edges to prevent horizontal movement and to permit vertical movement of the end and side walls of the container to effect their removal from the cart.

3. A cart comprising a container having a horizontally extending bottom plate and end and side walls superimposed on said plate, angles extending around the marginal edges and welded to the bottom face of said plate to provide downwardly extending flanges, a pair of supporting wheels, an axle connected with the side flanges and providing a mounting for the wheels, a tongue member having a rigid forked connection with said side angles, integrally formed flange members projecting upwardly from the front and sides of the plate and operatively engaging the corresponding walls of the container, and a plurality of standards removably connected with said plate and cooperating with said upwardly projecting flanges to hold said walls against horizontal movement and to permit vertical movement thereof to effect their removal from the cart.

4. A cart comprising a container having a horizontally extending bottom plate and end and side walls superimposed on the plate, a pair of supporting wheels, an axle connected with said plate and providing a mounting for the wheels, a tongue member having a rigid forked connection with the opposite sides of the plate, said plate having its front and side edges turned up to provide integral flanges engaging the front and side walls of the container, standards removably connected with the bottom plate at the front and rear of the container adapted to prevent horizontal movement of the front and side walls and to permit vertical movement thereof to effect their removal and installation, and means projecting from the side walls in spaced relation to the rear standards and cooperating therewith to provide a holder preventing horizontal movement of the rear wall and permitting vertical movement thereof to effect its removal.

5. A cart comprising a container having a horizontally extending bottom plate, angles extending along the sides and welded to the bottom face of said plate, a pair of supporting wheels, an axle connected with said angles and providing a mounting for the wheels, a tongue member having a rigid forked connection with said angles, a U-shaped plate resting on the bottom plate and forming the front end and the side walls of the container, the sides and front end of the bottom plate being upturned to provide flanges extending around the U-shaped plate, a pair of front standards operatively engaging said U-shaped plate and cooperating with said flanges to hold said plate against horizontal movement and to permit vertical movement thereof to effect its removal, a tail gate forming the rear end of the container, a pair of rear standards removably connected with said bottom plate, the rear ends of said U-shaped plate respectively providing arcuate flanges engaging said rear standards, a pair of inwardly projecting elements connected with said U-shaped plate and respectively positioned in spaced relation to the rear standards to provide a holder in which said tail gate is positioned and held against horizontal movement.

6. A cart consisting of a horizontally extending load supporting plate, an axle fastened to and providing a support for said plate near its transverse center line, a pair of wheels respectively mounted on the ends of said axle in spaced relation to said plate, a tongue member rigidly connected with the front end of said plate, a U-shaped plate resting upon and extending around the front and side margins of the supporting plate with its rear edges forming transversely projecting flanges, and standards removably connected with the bottom plate at each corner thereof and positioned to cooperatively engage and hold the U-shaped plate against movement towards either side of the load supporting plate and to permit vertical movement thereof for its removal, the rear standards operatively engaging said flanges and the front standards operatively engaging the front end of said U-shaped plate to prevent longitudinal movement thereof on said load supporting plate.

7. A cart consisting of a horizontally extending load supporting plate, an axle fastened to and providing a support for said plate near its transverse center line, a pair of wheels respectively mounted on the ends of said axle in equally spaced relation to the edges of said plate, a tongue member rigidly connected with the front end of said plate, a U-shaped plate resting upon and extending around the front and side margins of the supporting plate with its rear edges forming inturned flanges, standards removably connected with the bottom plate at each corner thereof, said standards being positioned inside of and operatively engaging the adjacent side of said U-shaped plate to prevent movement thereof towards either side of the supporting plate and to permit vertical movement thereof to effect its removal, the front standards operatively engaging the front end of the U-shaped plate and the rear standards operatively engaging said flanges to prevent longitudinal movement of the U-shaped plate, an element projecting inwardly from each side of the U-shaped plate in spaced relation to the adjacent rear standards, and a removable vertically extending rear end plate having its opposite edges positioned between and operatively engaging said elements and rear standards.

EDWIN L. MASTERS.